US011240726B2

(12) United States Patent
Albero et al.

(10) Patent No.: US 11,240,726 B2
(45) Date of Patent: Feb. 1, 2022

(54) COMMUNICATION CONTINUITY DEVICE

(71) Applicant: Bank of America Corporation, Charlotte, NC (US)

(72) Inventors: George Albero, Charlotte, NC (US); Elijah Clark, Charlotte, NC (US); Elizabeth Swanzy-Parker, Charlotte, NC (US); Andrew Sides, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/918,747

(22) Filed: Jul. 1, 2020

(65) Prior Publication Data

US 2022/0007253 A1    Jan. 6, 2022

(51) Int. Cl.
*H04W 36/30* (2009.01)
*H04B 17/373* (2015.01)
*H04L 12/26* (2006.01)
*H04L 29/08* (2006.01)
*H04W 88/06* (2009.01)
*H04W 48/18* (2009.01)

(52) U.S. Cl.
CPC .......... *H04W 36/30* (2013.01); *H04B 17/373* (2015.01); *H04L 43/0811* (2013.01); *H04L 67/16* (2013.01); *H04W 48/18* (2013.01); *H04W 88/06* (2013.01)

(58) Field of Classification Search
CPC ..... H04W 36/30; H04W 88/06; H04W 48/18; H04L 43/0811; H04L 67/16; H04B 17/373

See application file for complete search history.

(56) References Cited

U.S. PATENT DOCUMENTS

| | | |
|---|---|---|
| 5,844,886 A | 12/1998 | Szentesi |
| 7,653,188 B2 | 1/2010 | Kloberdans et al. |
| 8,005,706 B1 | 8/2011 | Cassone et al. |
| 8,817,652 B1 | 8/2014 | Francis |
| 9,590,892 B2 | 3/2017 | Shah Heydari et al. |
| 9,674,056 B2 | 6/2017 | Francis |
| 9,877,250 B2 | 1/2018 | Sidhu et al. |
| 10,185,832 B2 | 1/2019 | Cam |
| 2004/0093493 A1* | 5/2004 | Bisbee .................. G07F 7/08 713/156 |
| 2008/0189154 A1 | 8/2008 | Wainwright |

* cited by examiner

*Primary Examiner* — Diane D Mizrahi
(74) *Attorney, Agent, or Firm* — Banner & Witcoff, Ltd.

(57) ABSTRACT

A communication continuity device configured to automatically switch to alternative communication service providers and/or communication channels in response to a predicted or identified communication degradation event. The communication continuity device includes a communication hub configured to receive communication channels from different sources, and an intelligent switch device that is configured to select a communication channel to provide connectivity between an internal network within an organization and an external network outside of the organization.

18 Claims, 5 Drawing Sheets

Prioritization Array 300

| User Type 302 | Priority 304 | Location 306 | Primary Connection(s) 308 | Secondary Connection(s) 310 | Connection Intermediaries 312 |
|---|---|---|---|---|---|
| Individual_1 322 | Level_A 324 | City_1 326 | Wired_1 328<br>Wired_2 330<br>Cellular_1 332 | Wired_3 334<br>Wired_4 336<br>Cellular_2 338 | Office_1 340<br>Office_2 342<br>Office_3 344 |
| Individual_2 346 | Level_B 348 | City_1 326 | Wired_1 328<br>Wired_2 330<br>Cellular_1 332 | Wired_3 334<br>Wired_4 336<br>Cellular_2 338 | Office_1 340<br>Office_2 342<br>Office_3 344 |
| Individual_3 350 | Level_C 351 | City_2 352 | Wired_5 354<br>Wired_6 356<br>Cellular_1 332 | Wired_7 358<br>Wired_8 360<br>Cellular_2 338 | Office_1 340<br>Office_2 342<br>Office_3 344 |
| Workgroup_1 322 | Level_A 324 | City_1 326 | Wired_1 328<br>Wired_2 330<br>Cellular_1 332 | Wired_3 334<br>Wired_4 336<br>Cellular_2 338 | Office_1 340<br>Office_2 342<br>Office_3 344 |
| Office_1 340 | Level_A 324 | City_1 326 | Wired_1 328<br>Wired_2 330<br>Cellular_1 332 | Wired_3 334<br>Wired_4 336<br>Cellular_2 338 | Office_1 340 |
| Office_2 342 | Level_B 348 | City_1 326 | Wired_1 328<br>Wired_2 330<br>Cellular_1 332 | Wired_3 334<br>Wired_4 336<br>Cellular_2 338 | Office_2 342 |

FIG. 3

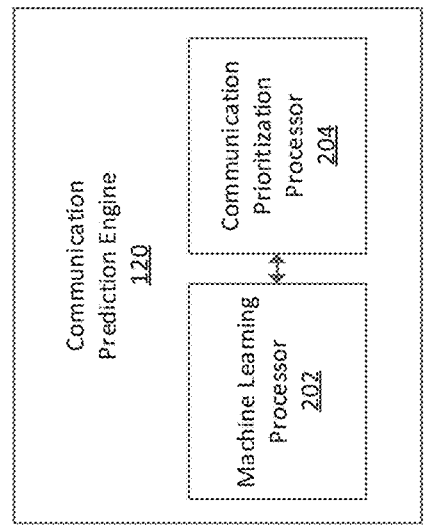

FIG. 2

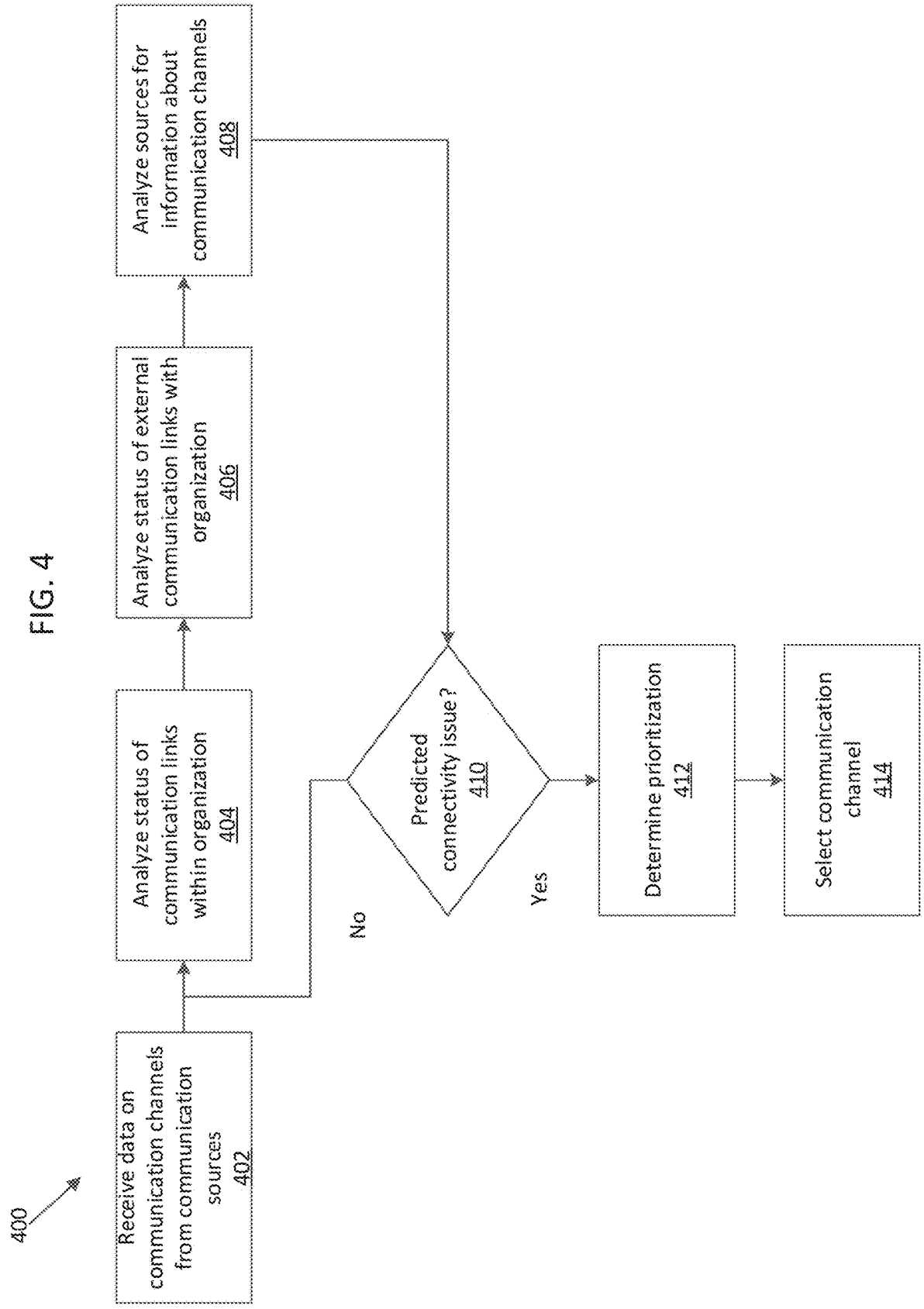

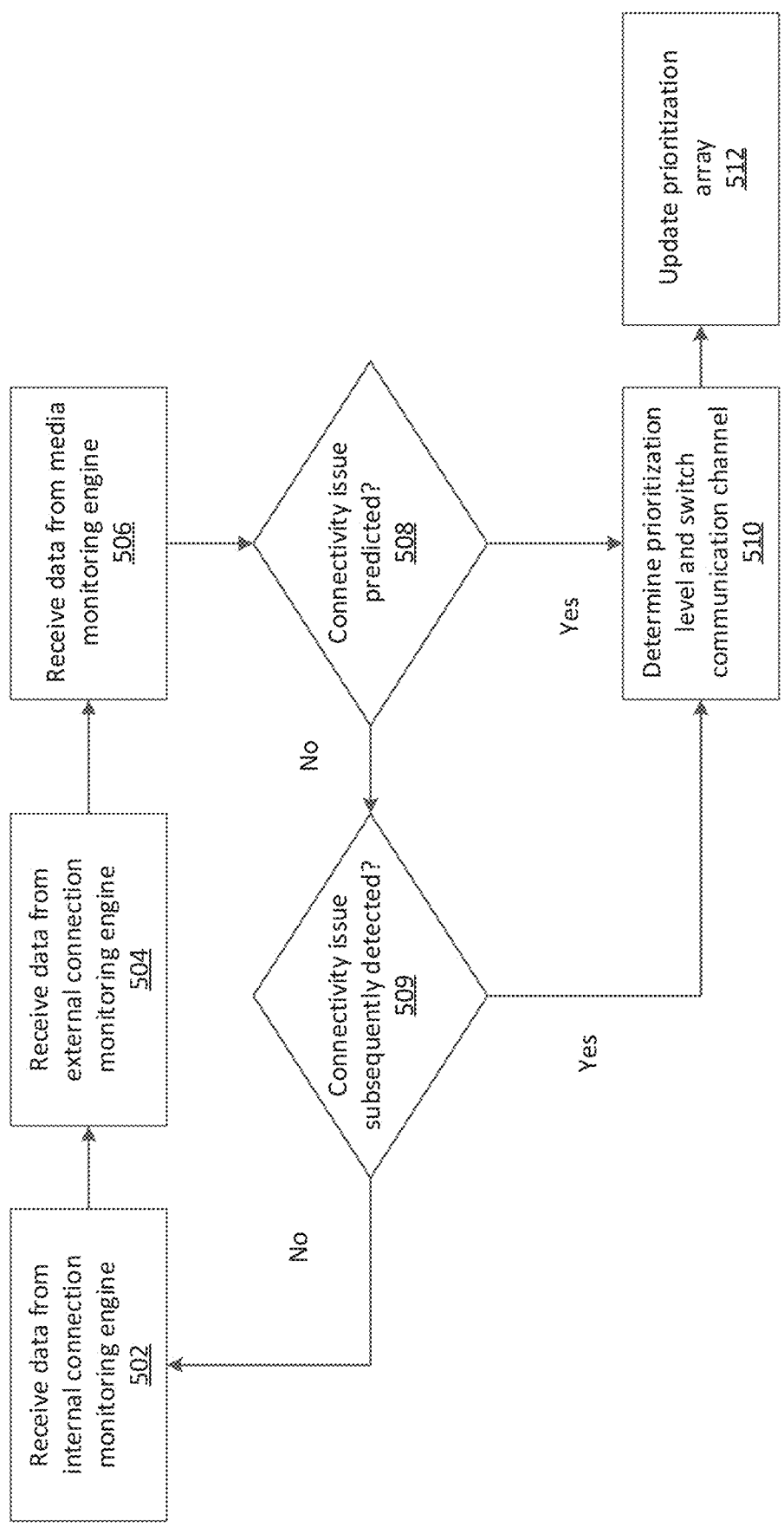

COMMUNICATION CONTINUITY DEVICE

TECHNICAL FIELD

Aspects of this disclosure generally relate to continuity of communication links for an organization, responsive to a communication degradation event. Aspects of the disclosure relate to a device that monitors communication links between an organization and one or more external networks, and switches one or more users within the organization to an alternative communication source or channel responsive to the communication degradation event.

BACKGROUND

A communication network service provider, such as an Internet service provider or a cellular network service provider, may experience network outages resulting from unexpected events that may include weather events, security events, or natural disaster events, among others. In other instances, a communication network may be partially degraded, such that connectivity speeds and latency may be deteriorated. In such instances, connectivity may be problematic if all users within an organization try to utilize the communication network resources. No device exists that accomplishes switching between redundant communication service providers responsive to a predicted and/or identified network degradation event and prioritization of user access to the network during such instances.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure includes a communication continuity device that has a communication hub device configured to receive multiple communication channels from multiple different sources. The communication continuity device may also include an intelligent switch device that is operatively connected to the communication hub device. The intelligent switch device may be configured to select a communication channel from the multiple communication channels available to the communication continuity device, in order to provide connectivity between an internal network within an organization and an external network outside of the organization. The intelligent switch device may also include an internal connection monitoring engine that is configured to analyze a status of communication links between devices within the organization. The intelligent switch device may also include an external connection monitoring engine that is configured to analyze the status of communication links between the communication hub device and the multiple different sources external to the organization. The intelligent switch device may also include a media monitoring engine that is configured to analyze publicly-available information sources for information relevant to at least one of the multiple communication channels linking the organization to one or more users outside of the organization. The intelligent switch device may also include a communication prediction engine that is configured to anticipate a connectivity issue between the organization and at least one of the multiple sources providing communication services to the organization. They communication prediction engine includes a machine learning processor that is configured to identify a potential future communication service interruption event. This identification of a potential future communication service interruption event is based upon information received from the internal connection monitoring engine, the external connection monitoring engine, and the media monitoring engine. The communication prediction engine additionally includes a communication prioritization processor that is configured to determine a prioritization of the user within the organization and switch the user to the selected communication channel, from the multiple communication channels available to the communication continuity device. This switching is performed based upon the determined prioritization of the user.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

FIG. 2 schematically depicts a more detailed view of a communication prediction engine, according to one or more aspects described herein;

FIG. 3 schematically depicts a prioritization array, according to one or more aspects described herein;

FIG. 4 is a flowchart diagram of a process for selecting a communication channel in response to a predicted connectivity issue, according to one or more aspects described herein;

FIG. 5 schematically depicts a flowchart of a process for updating a prioritization array, according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
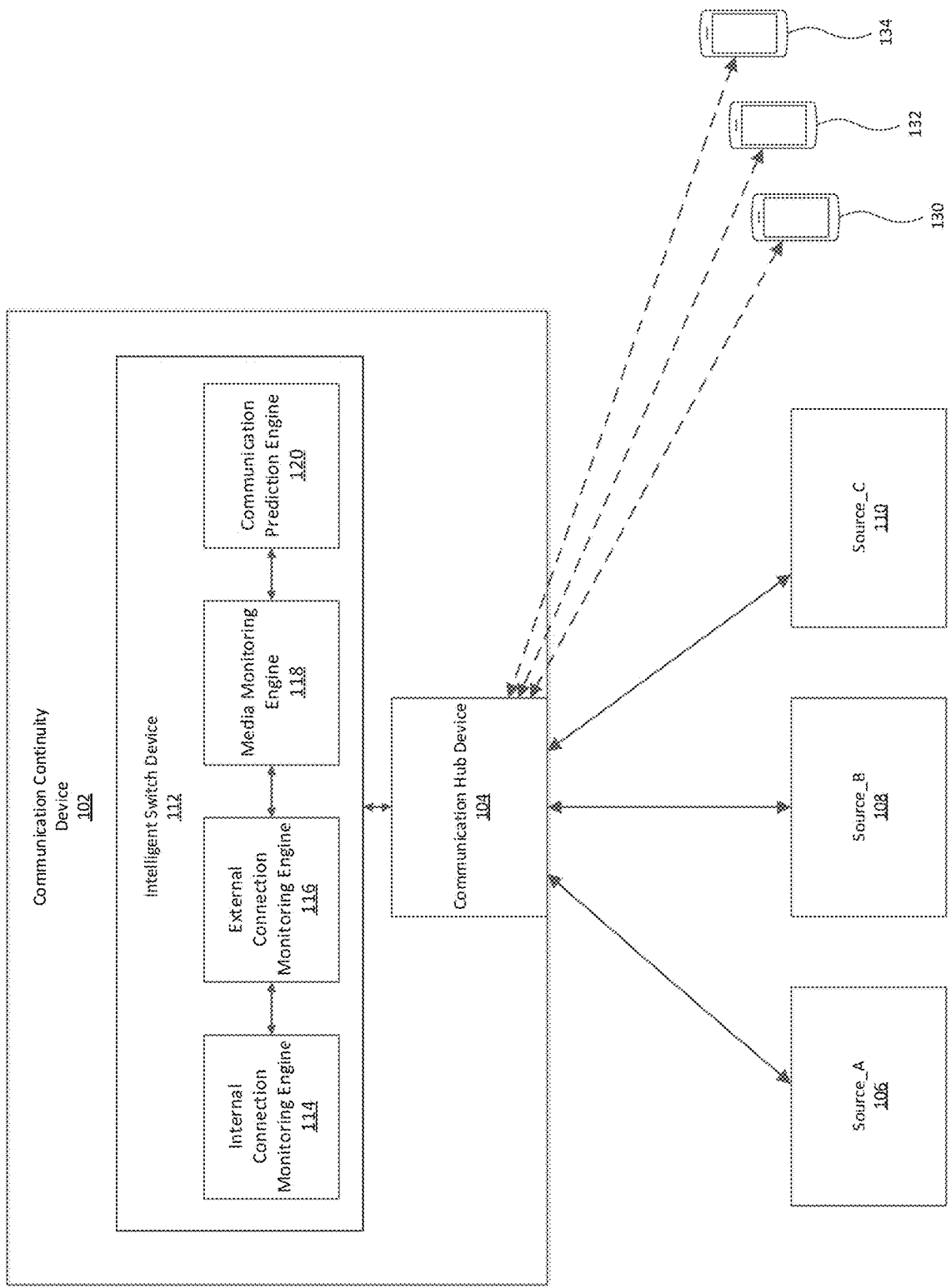
FIG. 1 schematically depicts a communication continuity device, according to one or more aspects described herein.

FIG. 1 schematically depicts a communication continuity device 102, according to one or more aspects described herein. It is contemplated that the communication continuity device 102 may be implemented as one or more hardware elements that include one or more application-specific integrated circuits. In other examples, the communication continuity device 102 may include software and/or firmware elements in order to implement the functionality described herein. Further examples of implementations of the communication continuity device 102 are presented in proceeding sections of this disclosure.

The communication continuity device 102 may be configured to manage one or more communication options available to an organization. In the context of this disclosure, an organization may include any business or entity type. In one example, the communication continuity device 102 may be configured to anticipate and/or respond to an interruption in communication between the organization associated with the device 102, and an external organization or user in communication with the device 102 through a wide area network, a telephone network, and/or the Internet, or any other type of network. The communication continuity device 102 may be configured to select one or more alternative communication sources or channels to ensure that an organization associated with the communication continuity device 102 has uninterrupted or limited interruption of communication services. In one example, the communication continuity device 102 may utilize artificial intelligence processes to anticipate and/or respond to communication interruption events. In response, the communication continuity device 102 may physically and/or digitally switch between communication service providers and/or physical communication channels (wired or wireless channels) delivering communication data to the organization associated with the communication continuity device 102. In one example, the organization associated with the communication continuity device 102 may include one or more physical office locations in a single building or multiple buildings, and in a single geographic location, or multiple, dispersed geographic locations.

The communication continuity device 102 may include a communication hub device 104 that is configured with the hardware, firmware, and/or software to facilitate communication between the communication continuity device 102, and a plurality of communication channels from multiple different sources. Three exemplary sources are schematically depicted in FIG. 1 as Source_A 106, Source_B 108, and Source_C 110. However, the communication continuity device 102 may be implemented with a plurality of different sources in excess of those three sources 106-110 schematically depicted in FIG. 1. Further, the communication continuity device 102 may be in operative communication with a single source, or two sources, without departing from the scope of these disclosures. These sources 106-110 may be sources of analog or digital communication between the communication continuity device 102 and one or more entities external to the communication continuity device 102. In one example, one or more of the sources 106-110 may be an Internet service provider, a conventional telephone service provider, or a cellular phone service provider, among others. The one or more sources 106-110 may provide wired or wireless Internet and/or telephony connectivity to the communication continuity device 102. The physical hardware utilized by the service provider sources 106-110 may include one or more of any suitable hardware channels for communicating Internet connectivity. For example, one or more of the sources 106-110 may utilize fiber optic hardware, conducting wire (DSL, co-axial cable, POTS), a spectrum of frequencies of light (infra-red, radio, microwaves) to facilitate wireless communication, or a combination thereof, among others. In addition, each source 106-110 may have multiple different physical communication channels to the communication hub device 104. One or more of the sources 106-110 may be configured to provide connectivity to a public or private wide area network that is external to an organization associated with the communication continuity device 102. In addition to facilitating communication between one or more internal networks within the organization and one or more external networks outside of the organization, the communication hub device 104 may facilitate communication with mobile devices 130-134 used by employees of the organization. The depicted mobile devices 130-134 are representative of the hundreds or thousands of such devices that may connect to the communication hub device 104 within the organization. Communication with the mobile devices 130-134 may be considered internal communication, and devices 130-134 may provide information on communication quality and status to the communication hub device 104, which may be analyzed by the intelligent switch device 112. In one example, the mobile devices 130-134 may include cell phones, smart phones, or tablet devices among others, which are connected through a network that is external to the organization, such as a cellular network or a wireless Internet connection. However, the devices 130-134 may connect to an internal network within the organization through a virtual private network (VPN) ore equivalent service, such that certain data received from one or more of the devices 130-134 may be treated as internal, secure data.

The communication hub device 104 may be configured with hardware, firmware, and/or software configured to physically and/or digitally switch between different communication channels that facilitate communication between the organization and one or more of the sources 106-110 external to the organization. The processes to determine which sources and/or communication channels to those sources should be selected are executed by the intelligent switch device 112 that is in operative communication with the communication hub device 104.

The intelligent switch device 112 is configured to anticipate and/or react to communication degradation events that would interrupt communication between the organization and one or more of the sources 106-110. Specifically, the intelligent switch device 112 is configured to execute one or more processes to avoid or mitigate an interruption in communications by rerouting communications or selecting an alternative communication provider that facilitates communication between the organization and an external entity (such as a user external to the organization, and/or another business, among others).

The intelligent switch device 112 includes an internal connection monitoring engine 114 that is configured to analyze a status of communication links between devices within the organization. As such, the internal connection monitoring engine 114 may execute one or more processes to analyze connectivity to a plurality of computer devices connected to one or more internal networks within the organization, in addition to telephony connectivity between users and/or office spaces within the organization. The internal connection monitoring engine 114 may request or may receive unsolicited network status information. The status information may be received periodically, or may be event-specific. It is contemplated that any network connectivity metrics may be utilized to determine the status of one or more networks or sub-networks within the organization.

For example, data transfer speeds and/or latency may be utilized to determine the quality of data communication within the organization.

The intelligent switch device 112 also includes an external connection monitoring engine 116 that is configured to analyze a status of communication links between the communication hub device 104 and multiple different sources, such as sources 106-110. Accordingly, the external connection monitoring engine 116 may execute one or more processes to analyze a quality of network connections between one or more of the sources 106-110 and the communication continuity device 102. In a similar manner to the internal connection monitoring engine 114, the external connection monitoring engine 116 may utilize any suitable metrics to determine the status of network connectivity. In one example, the external connection monitoring engine 116 may test the network connectivity speed and/or latency on one or more of the communication channels providing connectivity between the organization and one or more external networks, such as the Internet.

The intelligent switch device 112 includes a media monitoring engine, that is configured to analyze publicly-available information sources for information relevant to at least one of the communication channels associated with one or more of the sources 106-110. As such, the media monitoring engine 118 may execute one or more processes to search various information sources for information directly or indirectly related to one or more of the communication channels associated with sources 106-110. In particular, the media monitoring engine 118 may monitor news feeds for information related to natural disasters, weather events, security events, stock market events (e.g., a stock market movement above a certain threshold associated with one or more communication companies providing connectivity to the organization through one or more resources 106-110), power outages, or communication network outages. The media monitoring engine 118 may monitor news feeds for information specific to a geographic region or regions associated with the organization, or may monitor news feeds on a global scale. The media monitoring engine 118 may execute one or more processes to search through publicly-available media sources, such as news websites or news feeds or social media feeds, among others. The media monitoring engine 118 may execute one or more processes to search for keywords associated with events that may impact connectivity between the organization and one or more of the sources 106-110. In another example, the media monitoring engine 118 may be configured to receive automated, or manually entered information from one or more sources. In one example, the media monitoring engine 118 may receive information using a secondary communication channel to the primary communication channels utilized by the organization to facilitate network communication between the organization and one or more external networks, such that the media monitoring engine 118 may be unaffected by a degradation event that affects the primary communication channels.

The intelligent switch device 112 may additionally include a communication prediction engine 120. The communication prediction engine 120 may be configured to anticipate a connectivity issue between the organization and at least one of the multiple sources 106-110. The communication prediction engine 120 may receive data from the internal connection monitoring engine 114, the external connection monitoring engine 116, and/or the media monitoring engine 118. This received data may be used to generate a prediction of a communication interruption event/ communication degradation event. In one example, the prediction of the communication interruption event may be implemented by the communication prediction engine 120 using one or more artificial intelligence processes. In addition, the communication prediction engine 120 may be configured to identify and confirm a communication interruption event using data received from engines 114-118. In response to a prediction and/or a confirmation of a communication interruption event, the communication prediction engine 120 may execute one or more processes to instruct the communication hub device 140 switch to an alternative communication source and/or alternative communication channels in order to facilitate uninterrupted/minimally interrupted communication between the organization and one or more users external to the organization.

FIG. 2 schematically depicts a more detailed view of the communication prediction engine 120, according to one or more aspects described herein. In one example, the communication prediction engine 120 includes a machine learning processor 202. The machine learning processor 202 may be configured to implement one or more machine learning processes in order to identify patterns in data received from one or more of the engines 114-118. Accordingly, the machine learning processor 202 may be configured to predict a communication degradation event from receive data. It is contemplated that the machine learning processor 202 may utilize any machine learning processes.

Advantageously, the machine learning processor 202 may be used to exclude extraneous information from data received from the engines 114-118 in order to predict a communication degradation event. The machine learning processor 202 may additionally execute one or more processes to identify new data patterns that have not been previously encountered during training of the artificial intelligence processes implemented by the machine learning processor 202. In one example, the machine learning processor 202 may store information about new patterns matched to one or more communication degradation events within a prioritization array, as schematically depicted as prioritization array 300 in FIG. 3.

In one example, a framework for machine learning implemented by the machine learning processor 202 may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned by to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals clearer, given the nearly infinite number of variables that can possible be optimized in the machine learning system.

In some embodiments, one or more of the processes executed by the machine learning processor 202 may use a system of machine learning and/or artificial intelligence to improve accuracy of the determinations made by said device 202. As explained herein, a framework for machine learning may involve a combination of supervised and unsupervised learning models.

The communication prediction engine 120 may additionally include a communication prioritization processor 204. This communication prioritization processor 204 may be configured to determine a prioritization of a user within the organization, and to define and output an instruction to switch the user to a selected communication channel, based upon the determined prioritization and information received from the machine learning processor 202 regarding a predicted or identified communication degradation event. In the context of the present disclosure, a "user" may be an individual, a team of multiple individuals, a workgroup, and office, a group of offices, a geographic region, or the organization as a whole.

The communication prioritization processor 204 may assign a prioritization to a user based upon one or more criteria. These criteria may change periodically or intermittently, and the communication prioritization processor 204 may update a prioritization associated with the user in response to each change in the relevant criteria. In one example, the communication prioritization processor 204 may determine a prioritization of a user within the organization based upon a predicted or predetermined priority of a project being completed by the user. The prioritization may also be determined based upon a job title or role of the user, and/or a time and location of the user at the time at which the prioritization level is being determined. In one example, a priority determined for a user may be used to give the user preferential access to communication resources during one or more communication degradation events. As such, users with greater need for access to communication resources are given priority to those resources. In one example a user may be given a higher priority based upon that user being in a time zone that is currently within normal working hours. In another example, a user may be given a higher priority based upon a job title or role, a current project being worked upon, a workgroup within which the user is working, or an office at which the user is working, among others. It is contemplated that a user may be assigned one of a number of different priority levels. In the prioritization array 300 of FIG. 3, three prioritization levels are schematically represented as levels 324, 348, and 351. However, the communication prioritization processor 204 may utilize any number of prioritization levels, without departing from the scope of these disclosures.

FIG. 3 schematically depicts a prioritization array 300, according to one or more aspects described herein. The prioritization array 300 is one example of a data structure within which the communication prediction engine 120 may store information regarding alternative communication sources and channels available to users within an organization, based upon historical and/or current prioritization levels associated with those users. It is contemplated that the prioritization array 300 may be stored using any data structure, and using any data management processes, without departing from the scope of these disclosures. In addition, it is contemplated that the prioritization array 300 may utilize additional or alternative data types to those depicted in FIG. 3, without departing from the scope of these disclosures.

The prioritization array 300 includes datatypes for a user type 302, a priority 304, a location 306, primary connections 308, secondary connections 310, and connection intermediaries 312. The user type 302 may store identifier information associated with a user, such as a name, employee identity number and/or additional biographical information. As previously indicated, a user may be an individual, a group of users, and office, a group of offices, or the organization as a whole, among others. Schematically depicted in FIG. 3 are six different types of users, including individual users 322, 346, 350, a workgroup of users 322, and offices 340 and 342. The priority 304 may store prioritization level associated with a user. This prioritization may be determined by the communication prioritization processor 204. In the schematic depiction of FIG. 3, three different prioritization levels are associated with the users, including priority level A 324, priority level B 348, and priority level C 351. It is contemplated that fewer or greater than three prioritization levels may be utilized, without departing from the scope of these disclosures. The prioritization array 300 may additionally store a location of a user under location 306. In the depicted example of FIG. 3, the users are located at one of two cities 326 and 352. However, additional locations may be stored. The primary connections 308 stores a list of one or more communication connection types available to the user under normal circumstances. These communication connection types may include wired or wireless channels. Accordingly, the primary connections 308 may list communication sources and/or channels through which users may connect to networks outside of the organization at times when no communication degradation event has been identified. Primary connections 328, 330, 332, 354, and 356 represent wired and cellular communication sources and/or channels. The secondary connections 310 lists alternative communication sources and/or channels available to a user during a communication degradation event. Accordingly, the communication prediction engine 120 may select one or more of the secondary connections 310 in response to a predicted or identified communication degradation event. As such, secondary connections 334, 336, 338, 358, 360 represent wired and cellular communication sources and/or channels. The connection intermediaries 312 lists nodes through which a user may connect to a desired destination. For example, a user may connect through an external network to an internal network within the organization by utilizing a virtual private network (VPN) connection to/through one or more of the connection intermediaries 302. FIG. 3 schematically depicts three different office locations 340-344 as connection intermediary options. However, it is contemplated that connection intermediaries 312 may include additional or alternative node types.

FIG. 4 is a flowchart diagram 400 of a process for selecting a communication channel in response to a predicted connectivity issue, according to one or more aspects described herein. One or more processes may be executed at block 402 to receive data on communication channels from one or more communication sources. In one example, these communication sources may be sources 106-110. Accordingly, the data may be received on a wired or wireless channel from one or more sources facilitated by one or more service providers. The data received at block 402 may be received by the communication continuity device 102, and specifically, the communication hub device 104.

Block 404 represents one or more processes executed to analyze a status of one or more communication links within the organization. Accordingly, the one or more processes executed at block 404 may be executed by the internal connection monitoring engine 114. These one or more processes may monitor one or more metrics associated with internal communication links within the organization, including an availability of connections between multiple different nodes within an internal network, and a speed and latency of data transmission between said nodes.

In a similar manner, one or more processes may be executed at block 406 to analyze a status of external communication links with the organization. In one example, the analysis of external communication links may be implemented by the external connection monitoring engine 116. The processes executed at block 406 may include monitoring an availability of one or more communication channels between the communication hub device 104 and one or more external source and/or destination devices. In addition, the processes executed at block 406 may monitor a speed and/or latency of those communication links between the communication hub device 104 and one or more devices external to the organization.

One or more processes may be executed at block 408 to analyze sources for information about one or more communication channels facilitating network communication between the organization and external sources/destination computers. These one or more processes executed at block 408 may be executed by the media monitoring engine 118.

One or more processes may be executed at decision block 410 to determine if a connectivity issue is predicted, based upon those analyses associated with blocks 404, 406, and 408. This prediction may be executed by the communication prediction engine 120. It is determined that no connectivity issue is predicted, flowchart 400 may proceed back to block 404, whereby the analyses 404, 406, and 408 may be executed on a continual, periodic, or intermittent basis. If it is determined at decision block 410 that a connectivity issue is predicted, flowchart 400 proceeds to block 412. One or more processes may be executed at block 412 to determine a prioritization of the user attempting to access network resources within the organization. This user may be attempting to access the network resources within the organization from a device directly connected to an internal network within the organization, or from a device connected through an external network. The one or more processes executed at block 412 may be executed by the communication prediction engine 120.

A communication channel may be selected for a user based upon one or more processes executed at block 414.

This selection of a communication channel may be based upon the predicted connectivity issue and the determined prioritization associated with the user. Further, the selection of a communication channel may be executed by the communication prediction engine 120.

FIG. 5 schematically depicts a flowchart 500 of a process for updating a prioritization array, according to one or more aspects described herein. In certain examples, the flowchart 500 may be combined with flowchart 400 to provide for enhanced communication continuity for an organization. In one example, one or more processes may be executed at block 502 to receive data from an internal connection monitoring engine, such as internal connection monitoring engine 114. These one or more processes may be executed by the communication prediction engine 120, such that the engine 120 receives data regarding the status of one or more internal network links within the organization. Block 504 may include execution of one or more processes to receive data from an external connection monitoring engine, such as the external connection monitoring engine 116. These one or more processes executed by block 504 may be executed by the communication prediction engine 120, such that the data received from the external connection monitoring engine 160 may be utilized to inform the prediction and/or identification of a communication/connectivity degradation event. One or more processes may be executed at block 506 to receive data from a media monitoring engine, such as media monitoring engine 118. Again, the one or more processes executed at block 506 may be executed by the communication prediction engine 120. Accordingly, the communication prediction engine 120 may aggregate the data received at block 502, 504, and 506 and execute one or more artificial intelligence processes to predict a network connectivity issue, which may be a communication degradation event that diminishes the quality of a communication link between the organization and one or more external devices. One or more processes may be executed at decision block 508 to determine if a connectivity issue is predicted. These one or more processes may be executed by the communication prediction engine 120. If no connectivity issue is predicted, flowchart 500 may proceed to decision block 509. At block 509, one or more processes may be executed to determine if a connectivity issue is subsequently detected. This detection may be based upon an observed degradation in communication channels/processes, among others. These one or more processes executed at block 509 may be executed by the communication prediction engine 120. If no connectivity issue is detected, flowchart 500 may proceed back to block 502, such that block 502, 504, and 506 may be periodically, continuously, or intermittently executed. If a connectivity issue is predicted at block 508, or if a connectivity issue is subsequently detected at block 509, flowchart 500 may proceed to block 510. Accordingly, one or more processes may be executed at block 510 to determine a prioritization level of the user, and switch one or more communication channels for said user. These one or more processes may be executed by the communication prediction engine 120. Flowchart 500 may proceed to block 512, whereby one or more processes may be executed to update the prioritization array, such as array 300. These one or more processes executed at block 512 may be executed by the communication prediction engine 120.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of FIG. 1 may be implemented as standalone hardware elements embodied as application-specific integrated circuits or similar hardware elements. In another example, two or more of the elements of FIG. 1 may be combined together and implemented as dedicated hardware elements. In yet another example, one or more elements of FIG. 1 may be implemented as firmware and/or software modules. Further, one or more of the elements of FIG. 1 may be embodied using a general-purpose or specialized computing system, such as computing system 600 from FIG. 6.

Figure 6:
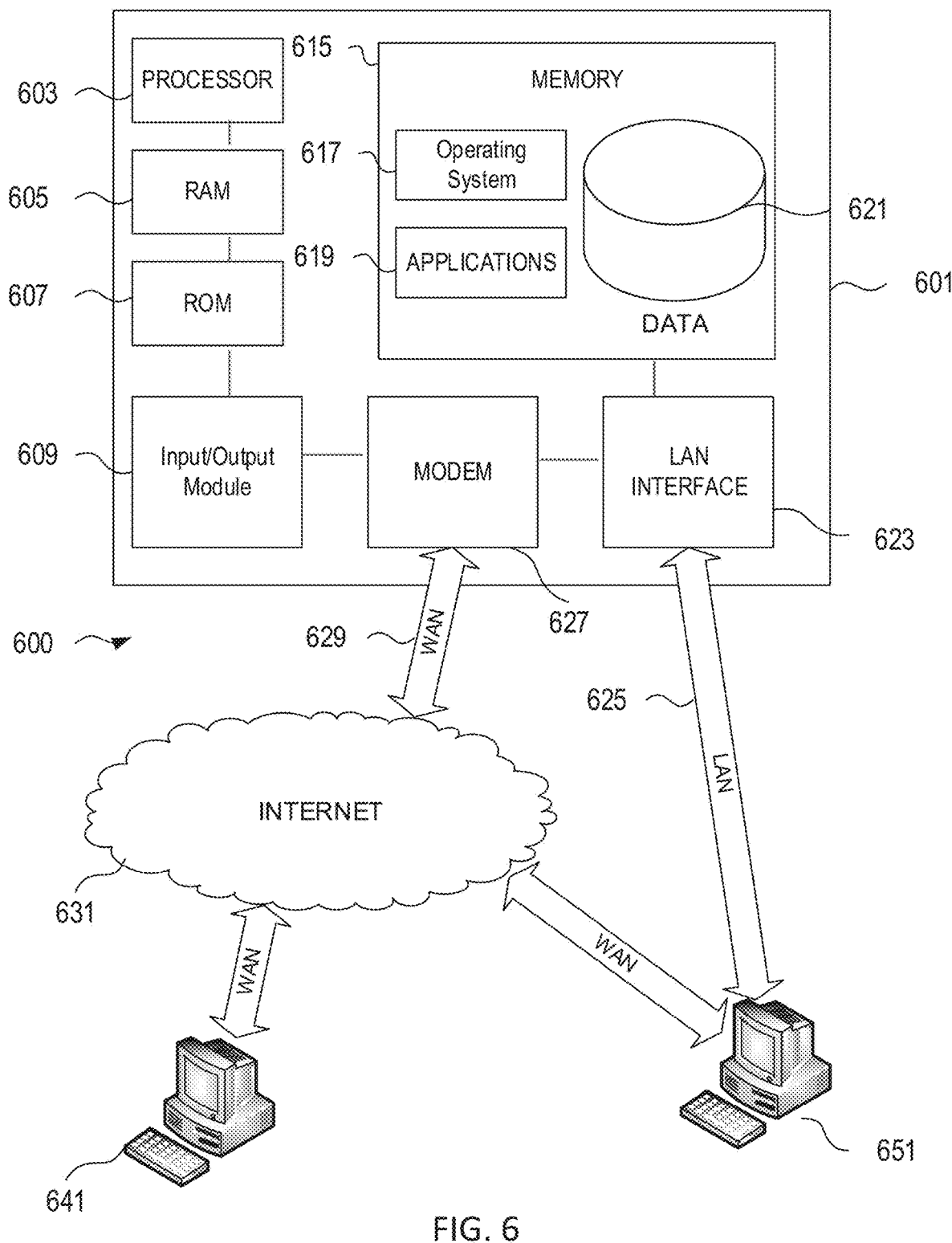
FIG. 6 shows an illustrative operating environment in which various aspects of the disclosure may be implemented, according to one or more aspects described herein.

As such, the communication continuity device 102, or one or more of the modules of the apparatus 102 may be implemented as one or more network-linked computer devices, such as device 601 from FIG. 6. Thus, the communication continuity device 102 may be implemented on consolidated computing hardware, such as computing device 601, at a single geographic location, and/or on a single integrated circuit, and the like. In another example, the communication continuity device 102 may be implemented across multiple computing devices at a common, or dispersed geographic locations. In one example, the device 601 may be in communication with devices 641 and 651 using one or more networking technologies (625, 629, and/or 631) described in further detail in the description that follows.

In one example implementation, computing device 601 may have a processor 603 for controlling overall operation of device 601 and its associated components, including RAM 605, ROM 607, an input/output (I/O) module 609, and memory 615. In one example, as will be apparent to those of ordinary skill in the art, memory 615 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 615 may comprise a non-transitory computer-readable medium that may communicate instructions to processor 603 to be executed.

I/O module 609 may include a microphone, keypad, touch screen, and/or stylus through which a user of the computing device 601 may provide input, and may also include one or more of a speaker for providing audio output and a video display device for providing textual, audiovisual and/or graphical output. Software may be stored within memory 615 and/or storage to provide instructions to the processor 603 for allowing the computing device 601 to perform various functions. For example, memory 615 may store software used by the computing device 601, such as an operating system 617, application programs 619, and an associated database 621. The processor 603 and its associated components may allow the computing device 601 to run a series of computer-readable instructions to process and format data.

The computing device 601 may operate in a networked environment supporting connections to one or more remote computers, such as computing devices 641 and 651. In one example, the computing devices 641 and 651 may be personal computers or servers that include many, or all, of the elements described above relative to the computing device 601. Specifically, the computing device 641 may represent one or more elements of the remote environment 120 and computing device 651 may represent one or more elements of the destination environment 140. Alternatively, computing device 641 and/or 651 may be a data store that is affected by the operation of the computing device 601. The network connections depicted in FIG. 6 include a local area network (LAN) 625 and a wide area network (WAN) 629, but may also include other networks. When used in a LAN networking environment, the computing device 601 is connected to the LAN 625 through a network interface or adapter 623. When used in a WAN networking environment, the computing device 601 may include a modem 627 or other means for establishing communications over the WAN 629, such as the Internet 631. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 619 used by the computing device 601 according to an illustrative embodiment of the disclosure may include computer-executable instructions for invoking functionality related to a protocol-agnostic file transfer apparatus 102. The computing device 601 and/or the other devices 641 or 651 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the communication continuity device 102 is configured to greatly reduce the time needed to manually respond to communication degradation events by implementing an automated system for seamlessly transitioning between communication sources, and such that the amount of time that an organization spends without a communication link to one or more external users is greatly reduced or eliminated. The communication continuity device 102 may be configured to monitor and address communication issues associated with thousands of users within an organization, and may handle these users simultaneously. When communication links cannot be provided to all users within an organization, the communication continuity device 102 may implement a prioritization system that provides preferential communication services to one or more subsets of users within the organization. The complexity associated with this prioritization is facilitated by the machine learning/artificial intelligence processes, thereby allowing the communication continuity device 102 to effectively distribute communication resources. This type of prioritization would not otherwise be possible without the functionality provided by the communication continuity device 102, including underlying machine learning processes.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a communication continuity device that has a communication hub device configured to receive multiple communication channels from multiple different sources. The communication continuity device may also include an intelligent switch device operatively connected to the communication hub device. The intelligent switch device may be configured to select a communication channel from the multiple communication channels available to the communication continuity device, in order to provide connectivity between an internal network within an organization and an external network outside of the organization. The intelligent switch device may also include an internal connection monitoring engine that is configured to analyze a status of communication links between devices within the organization. The intelligent switch device may also include an external connection monitoring engine that is configured to analyze the status of communication links between the communication hub device and the multiple different sources external to the organization. The intelligent switch device may also include a media monitoring engine that is configured to analyze publicly-available information sources for information relevant to at least one of the multiple communication channels linking the organization to one or more users outside of the organization. The intelligent switch device may also include a communication prediction engine that is configured to anticipate a connectivity issue between the organization and at least one of the multiple sources providing communication services to the organization. They communication prediction engine includes a machine learning processor that is configured to identify a potential future communication service interruption event/communication degradation event. This identification of a potential future communication service interruption event is based upon information received from the internal connection monitoring engine, the external connection monitoring engine, and the media monitoring engine. The communication prediction engine additionally includes a communication prioritization processor that is configured to determine a prioritization of the user within the organization and switch the user to the selected communication channel, from the multiple communication channels available to the communication continuity device. This switching is performed based upon the determined prioritization of the user.

The multiple different communication sources may include at least one source from a wired Internet service provider and at least one source from a wireless cellular service provider.

The external network outside of the organization may be the Internet.

The internal connection monitoring engine may be configured to analyze the status of communication links to multiple mobile devices operated by users within the organization.

The media monitoring engine may be configured to monitor media sources for information regarding security events, weather events, stock market events, power outages, and communication network outages within multiple different geographic regions.

The communication prioritization processor may be configured to determine a prioritization of a user within an organization, based upon a time zone of the user, such that the user is designated a higher prioritization during normal business hours.

The communication prioritization processor may be configured to determine the prioritization of a user within the organization based upon a predetermined priority of a project being completed by the user.

The intelligent switch device may select a physical communication channel associated with at least one of multiple communication channels available to the communication continuity device, and based upon a determined prioritization of the user.

In another aspect, a communication continuity device may include a processor, and a non-transitory, computer-readable medium comprising computer-executable instructions that, when executed by a processor, are configured to receive multiple communication channels from multiple different sources, analyze a status of communication links between devices within an organization, analyze a status of external communication links between a communication hub device and multiple different sources, and analyze publicly-available information sources for information relevant to at least one of the plurality of communication channels. The computer-executable instructions, when executed by the processor, may be further configured to predict a connectivity issue between the organization and at least one of the multiple different sources, determine a prioritization of the user within the organization, and select a communication channel, from the multiple communication channels, to provide connectivity between an internal network within the organization and an external network outside of the organization. The selection may be based upon a predetermined prioritization of the user and the predicted connectivity issue.

The computer-executable instructions, when executed by the processor, may be further configured to utilize machine learning processes to identify a potential future communication service interruption event. This identification of a potential future communication service interruption event may be based upon information received from analyzing the status of the communication links between devices within the organization, the status of communication links between the communication hub and multiple different sources, and the publicly-available information sources.

The multiple different sources may include at least one source from a wired Internet service provider and at least one source from a wireless cellular service provider.

The external network outside of the organization may be the Internet.

The computer-executable instructions, when executed by the processor, may be further configured to analyze the status of communication links to multiple mobile devices operated by users within the organization.

The computer-executable instructions that are executed by the processor may be further configured to monitor media sources for information regarding security events, weather events, stock market events, power outages, and mitigation network outages within multiple different geographic regions.

The determination of a prioritization of a user within the organization may be based upon a time zone of the user, such that the user is designated a higher prioritization during normal business hours.

The determination of a prioritization of a user within the organization may be based upon a predetermined priority of a project being completed by the user.

The computer-executable instructions, when executed by the processor, may be further configured to select a physical communication channel associated with the selected communication channel, from the multiple communication channels.

In another aspect, a method for selecting a communication channel for communication continuity may include receiving multiple communication channels from multiple different sources, analyzing a status of communication links between devices within an organization, analyzing a status of external communication links between a communication hub device and multiple different sources, and analyzing publicly-available information sources for information relevant to at least one of the multiple communication channels. The method may also include predicting a connectivity issue between the organization and at least one of the multiple different sources, determining a prioritization of the user within the organization, and selecting a communication channel, from the multiple communication channels, to provide connectivity between an internal network within the organization and an external network outside of the organization. This selecting of a communication channel may be based upon a determined prioritization of the user and a predicted connectivity issue.

The method may also include identifying, using a machine learning process, a potential future communication service interruption event, based upon information received from analyzing the status of the communication links between devices within the organization, the status of the communication links between the communication hub and the multiple different sources, and publicly-available information sources.

The multiple different sources may include at least one source from a wired Internet service provider and at least one source from a wireless cellular network service provider.

Accordingly, it will be understood that the invention is not to be limited to the embodiments disclosed herein, but is to be understood from the following claims, which are to be interpreted as broadly as allowed under the law.

What is claimed is:

1. A communication continuity device comprising:
    a communication hub device configured to receive a plurality of communication channels from multiple different sources;
    an intelligent switch device in operative communication with the communication hub device, configured to select a communication channel, from the plurality of communication channels, to provide connectivity between an internal network within an organization and an external network outside of the organization, the intelligent switch device further comprising:
    an internal connection monitoring engine, configured to analyze a status of communication links between devices within the organization;
    an external connection monitoring engine, configured to analyze a status of communication links between the communication hub device and the multiple different sources;
    a media monitoring engine, configured to analyze publicly-available information sources for information relevant to at least one of the plurality of communication channels;
    a communication prediction engine, configured to anticipate a connectivity issue between the organization and at least one of the multiple different sources, wherein the communication prediction engine further comprises:
    a machine learning processor, configured to identify a potential future communication service interruption event, based upon information received from the internal connection monitoring engine, the external connection monitoring engine, and the media monitoring engine; and
    a communication prioritization processor, configured to determine a prioritization of a user within the organization, and switch said user to the selected communication channel, from the plurality of communication channels, based upon the determined prioritization.

2. The communication continuity device of claim 1, wherein the multiple different sources comprise at least one source from a wired Internet service provider and at least one source from a wireless cellular service provider.

3. The communication continuity device of claim 1, wherein the external network outside of the organization is the Internet.

4. The communication continuity device of claim 1, wherein the internal connection monitoring engine is configured to analyze a status of communication links to a plurality of mobile devices operated by users within the organization.

5. The communication continuity device of claim 1, wherein the media monitoring engine is configured to monitor media sources for information regarding security events, weather events, stock market events, power outages, and communication network outages within multiple different geographic regions.

6. The communication continuity device of claim 1, wherein the communication prioritization processor is configured to determine the prioritization of the user within the organization, based upon a time zone of the user, such that the user is designated a higher prioritization during normal business hours.

7. The communication continuity device of claim 1, wherein the communication prioritization processor is configured to determine the prioritization of the user within the organization, based upon a predetermined priority of a project being completed by the user.

8. The communication continuity device of claim 1, wherein the intelligent switch device selects a physical communication channel associated with at least one of the plurality of communication channels, based upon the determined prioritization of the user.

9. A communication continuity device comprising:
    a processor;
    a non-transitory computer-readable medium comprising computer-executable instructions that, when executed by the processor, are configured to:
    receive a plurality of communication channels from multiple different sources;
    analyze a status of communication links between devices within an organization;
    analyze a status of external communication links between a communication hub device and the multiple different sources;
    analyze publicly-available information sources for information relevant to at least one of the plurality of communication channels;
    predict a connectivity issue between the organization and at least one of the multiple different sources;
    determine a prioritization of a user within the organization; and
    select a communication channel, from the plurality of communication channels, to provide connectivity between an internal network within the organization and an external network outside of the organization, based upon the determined prioritization of the user, and the predicted connectivity issue, wherein the external network outside of the organization is the Internet.

10. The communication continuity device of claim 9 wherein the non-transitory computer-readable medium comprises computer-executable instructions that when executed by the processor are further configured to:
    utilize machine learning processes to identify a potential future communication service interruption event, based upon information received from analyzing the status of the communication links between devices within the organization, the status of the communication links between the communication hub and the multiple different sources, and the publically-available information sources.

11. The communication continuity device of claim 9, wherein the multiple different sources comprise at least one source from a wired internet service provider and at least one source from a wireless cellular service provider.

12. The communication continuity device of claim 9, wherein the non-transitory computer-readable medium comprises computer-executable instructions that when executed by the processor are further configured to:

analyze a status of communication links to a plurality of mobile devices operated by users within the organization.

13. The communication continuity device of claim 9, wherein the non-transitory computer-readable medium comprises computer-executable instructions that when executed by the processor are further configured to:

monitor media sources for information regarding security events, weather events, stock market events, power outages, and communication network outages within multiple different geographic regions.

14. The communication continuity device of claim 9, wherein the determine the prioritization of the user within the organization is based upon a time zone of the user, such that the user is designated a higher prioritization during normal business hours.

15. The communication continuity device of claim 9, wherein the determine the prioritization of the user within the organization is based upon a predetermined priority of a project being completed by the user.

16. The communication continuity device of claim 9, wherein the non-transitory computer-readable medium comprises computer-executable instructions that when executed by the processor are further configured to:

select a physical communication channel associated with the selected communication channel, from the plurality of communication channels.

17. A method for selecting a communication channel for communication continuity, comprising:

receiving a plurality of communication channels from multiple different sources;

analyzing a status of communication links between devices within an organization;

analyzing a status of external communication links between a communication hub device and the multiple different sources;

analyzing publicly-available information sources for information relevant to at least one of the plurality of communication channels;

predicting a connectivity issue between the organization and at least one of the multiple different sources;

determining a prioritization of a user within the organization;

selecting a communication channel, from the plurality of communication channels, to provide connectivity between an internal network within the organization and an external network outside of the organization, based upon the determined prioritization of the user, and the predicted connectivity issuer; and identifying, using a machine learning process, a potential future communication service interruption event, based upon information received from analyzing the status of the communication links between devices within the organization, the status of the communication links between the communication hub and the multiple different sources, and the publicly-available information sources.

18. The method of claim 17, wherein the multiple different sources comprise at least one source from a wired internet service provider and at least one source from a wireless cellular service provider.

\* \* \* \* \*